Jan. 26, 1954   HO CHOW   2,666,971
FASTENER DEVICE
Filed July 5, 1952

INVENTOR.
HO CHOW
BY
Howard T. Thompson
ATTORNEY

Patented Jan. 26, 1954

2,666,971

UNITED STATES PATENT OFFICE 2,666,971

FASTENER DEVICE

Ho Chow, New York, N. Y.

Application July 5, 1952, Serial No. 297,291

6 Claims. (Cl. 24—221)

This invention relates to fastener devices for use in joining two or more sheet or other members together and tensionally supporting the same in assembled relationship with respect to each other.

The novel features of the invention will be best understood from the following description, when taken together with the accompanying drawing, in which certain embodiments of the invention are disclosed and, in which, the separate parts are designated by suitable reference characters in each of the views and, in which.

Figure 2:
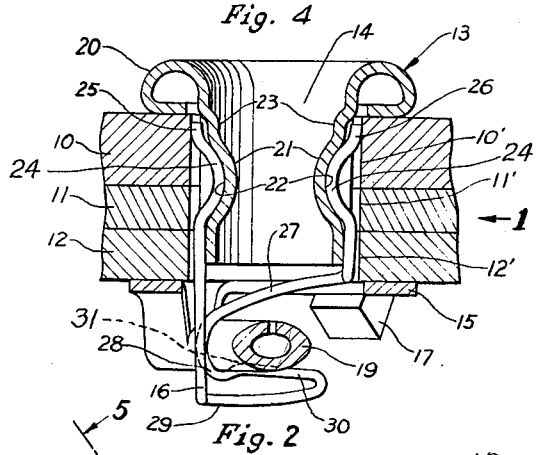
Fig. 2 is a sectional view on the line 2—2 of Fig. 3.

In Fig. 2 of the drawing, I have shown at 10, 11 and 12, three sheet members which are adapted to be coupled together by one of my improved fastener devices, generally identified by the reference character 13.

Figure 6:
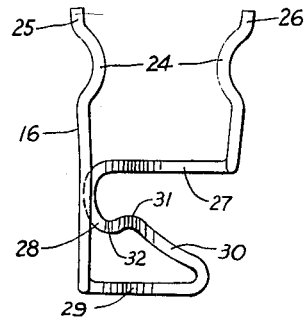
Fig. 6 is a side view of one of the spring members which I employ, detached.

The device 13 comprises a tubular or sleeve part 14 and a barred ring part 15, the part 14 including a pair of similar spring members 16, 16', the members 16 being shown in detail in Fig. 6 of the drawing.

Figure 5:
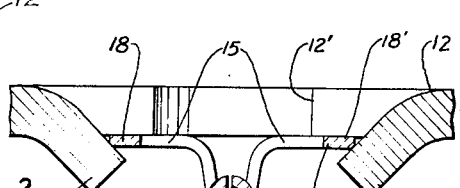
Fig. 5 is a partial section on the line 5—5 of Fig. 3, omitting part of the construction.

The sheet parts 10, 11 and 12 have apertures 10', 11' and 12' therein for reception of the sleeve part 14, as clearly noted in Fig. 2 of the drawing. The sheet part 12 is cut out on opposed walls of the opening 12' and fashioned to form downwardly extended lugs 17, note Fig. 5, for securing the barred ring 15 on the outer surface of the sheet member 12. The barred ring 15 comprises a sheet metal fabrication, wherein two semi-circular ring portions 18, 18' are joined by a raised and substantially cylindrical bar portion 19, the latter being in the form of a split tube, as will clearly appear from a consideration of Fig. 5 of the drawing.

The tubular sleeve part 14 terminates at its outer end in an outwardly, downwardly and inwardly formed flange portion 20, which produces a ring-like head on the sleeve adapted to engage the outer surface of the sheet part 10 in a manner clearly illustrated in Fig. 2 of the drawing.

Opposed side walls of the sleeve part 14 inwardly of the head 20 have inwardly pressed socket forming portions 21, the sockets 22 of which open outwardly through the sleeve portion and the sleeve is also offset, as seen at 23, to receive the spring members 16, 16'. The offset 23 actually forms longitudinal grooves in the outer surface of the sleeve 14 and the indentures, as at 21, are in alinement with these grooves. These indentures, having the recesses 22, are adapted to receive offset key portions 24 adjacent the ends 25, 26 of the springs, as clearly noted on the spring 16 of Fig. 6.

As above stated, the springs 16, 16' are of the same construction. Therefore, the brief description of one will apply to both.

Figure 1:
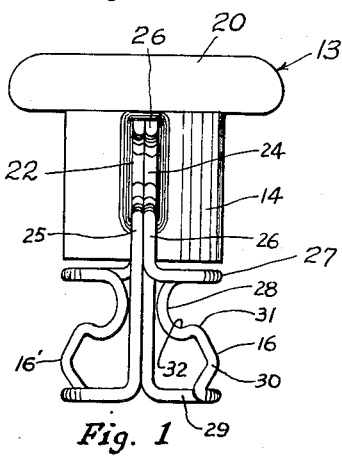
Fig. 1 is a side view of part of a device made according to my invention detached, the view looking in the direction of the arrow 1 of Fig. 2.

Considering Fig. 6 of the drawing, it will appear that the end portion 26 has approximately centrally of the spring a substantially semi-circular part 27 which terminates in a spring loop 28 arranged in the path of the semi-circular part 27, the loop 28 joining another substantially semi-circular part 29 at the lower end of the spring in a curved cam portion 30 having an abrupt offset, as at 31. The portion 30 also lies in the same circular path as the parts 27 and 29. In other words, in viewing the spring in plan and, here note Fig. 3, all portions of the spring are within the circular path with the exception of the key portions 24, which extend inwardly with respect to such path in entering the sockets or recesses 22. Normally, the springs 16, 16' or the portions 27, 28 and 30 thereof assume a position substantially as shown in Figs. 1 and 6 of the drawing. However, in assembling the parts in the manner shown in Fig. 2, the portions 28, 29 and 30 of the springs pass down through the openings 15' of the barred ring 15, at opposed sides of the bar 19 and, then, the sleeve 14 is rotated and, in this operation, the bar 19 rides up over the cam surfaces 30 of the springs to a position beyond the offset 31 and seat in recesses 32 of the loops 18 in retaining the parts in assembled relationship in the manner diagrammatically shown in Fig. 2 of the drawing.

Figure 4:
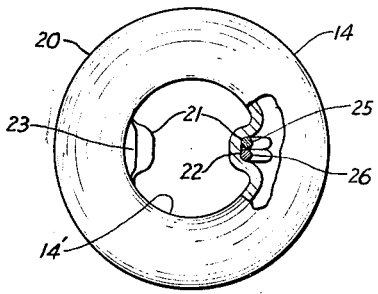
Fig. 4 is a plan view of the fastener shown in Fig. 2 with part of the construction broken away and omitting part of the background.

In the above operation, it will appear that the parts 27, 28, 29 and 30 are flexed in the manner diagrammatically seen in Fig. 4, thus providing a firm tensional engagement in supporting the sheet members 10, 11 and 12 in engagement with each other.

Figure 3:
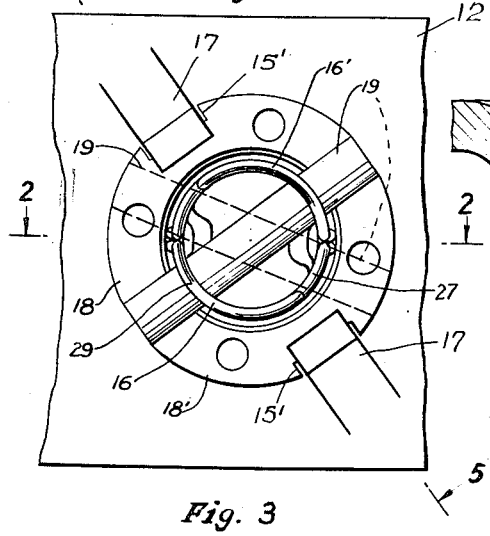
Fig. 3 is a bottom plan view of the construction as shown in Fig. 2.

It will clearly appear from a consideration of Figs. 1, 3 and 4 that the ends 25 and 26 of the respective springs abut each other in the grooves of the sleeve 14 formed by the offset 23 and the key portions 24 extend into the recesses 22, thus retaining the parts against relative rotation with respect to each other.

It will appear from a consideration of Fig. 4 of the drawing that the inward projections 21 form in the sleeve 14 an irregular bore 14' and a special wrench fitting this bore can be utilized in rotating the sleeve 14 in establishing the coupling engagement of the parts or in detaching the parts. On the other hand, a screw driver or other blade can be utilized between the protruding portions 21 in rotating the sleeve 14.

It is also preferred that, in fabricating the spring 16, the ends 25 and 26 flare outwardly to a slight extent so that, in assembling the sleeve with the springs thereon in the apertures 10', 11' and 12', the ends 25 and 26 will be flexed inwardly to establish positive engagement of the key members 24 with the members 21.

Considering Fig. 3 of the drawing, I have indicated in dotted lines the position of the cross-bar 19 as it would be assumed with respect to the fastener in initial assemblage of the parts and, here, it will be noted that the bar 19 is disposed between the ends of the ring portions 29, thus, in turning the fastener to the full line position of said figure, the same will ride up over the cam surfaces, establishing the locking engagement, as indicated in Fig. 2 of the drawing.

Considering Fig. 3 of the drawing, it will appear that the lugs 17 engage recesses 15' in the barred ring 15 to retain the ring against rotation in the operation of coupling the sleeve therewith. It will also be understood that, in coupling the ring 15 with the lugs, the semi-circular portions 18, 18' are flexed inwardly in the direction of the axis of the bar 19, as will be apparent from a consideration of Fig. 5 and then released to move into engagement with the lugs. It will also be understood that, in attachment of the device 13 with the plate members, the normally outwardly flexing ends 25—26 of each spring are forced inwardly by engagement with the walls of the apertures 10', 11' and 12', thus holding the offsets 24 in firm engagement with the sockets 22 and also establishing a frictional engagement in the apertures 10' which prevents accidental displacement of the device 13 with respect to the plates, prior to coupling of the device with the bar 19 as has been set forth.

Having fully described my invention, what I claim as new and desire to secure by Letters Patent is:

1. A fastener of the character described, comprising a sleeve, a head at one end of the sleeve, a pair of spring members keyed to said sleeve and projecting beyond the other end thereof, said springs having yielding cam portions beyond the limits of the sleeve and disposed in a substantially circular path, said sleeve being adapted to be passed through a pair of plate members to be secured together with the head of the sleeve engaging one outer plate member, and means engaging the other outer plate member and the cam portions of said springs for securely and tensionally supporting the plate members in assembled relationship.

2. A fastener of the character described, comprising a sleeve, a head at one end of the sleeve, a pair of spring members keyed to said sleeve and projecting beyond the other end thereof, said springs having yielding cam portions beyond the limits of the sleeve and disposed in a substantially circular path, said sleeve being adapted to be passed through a pair of plate members to be secured together with the head of the sleeve engaging one outer plate member, means engaging the other outer plate member and the cam portions of said springs for securely and tensionally supporting the plate members in assembled relationship, and means keying the springs to said sleeve.

3. A fastener of the character described, comprising a sleeve, a head at one end of the sleeve, a pair of spring members keyed to said sleeve and projecting beyond the other end thereof, said springs having yielding cam portions beyond the limits of the sleeve and disposed in a substantially circular path, said sleeve being adapted to be passed through a pair of plate members to be secured together with the head of the sleeve engaging one outer plate member, means engaging the other outer plate member and the cam portions of said springs for securely and tensionally supporting the plate members in assembled relationship, means keying the springs to said sleeve, said last named means comprising inwardly pressed portions on the sleeve engaged by offset key members on said springs, and said offset portions providing means for rotating the sleeve in the operation of coupling and uncoupling said plate members.

4. A fastener of the class described, comprising a tubular part adapted to be positioned within alined apertures of a pair of plate members, said part having an integral head portion at one end engaging one plate member, a pair of spring cam elements keyed to the tubular part within the environment of said plate members, said elements projecting at the other end of said part outwardly of the other plate member, a bar engaging the last named plate member and said elements, and said part having means facilitating rotation thereof in moving said elements over the bar in establishing tensional clamping engagement of the plate members between said head portion and bar.

5. A fastener of the class described, comprising a tubular part adapted to be positioned within alined apertures of a pair of plate members, said part having means engaging the outer surface of one plate member, a pair of spring elements keyed to said tubular part and tensionally engaging the walls of the aperture of at least one plate member, said elements protruding beyond the other of said plate members, and means tensionally engaging the elements and the surface of the second named plate member in tensionally securing the plate member between the first and second named means.

6. A fastener of the class described, comprising a tubular part adapted to be positioned within alined apertures of a pair of plate members, said part having means engaging the outer surface of one plate member, a pair of spring elements keyed to said tubular part and tensionally engaging the walls of the aperture of at least one plate member, said elements protruding beyond the other of said plate members, means tensionally engaging the elements and the surface of the second named plate member in tensionally securing the plate member between the first and second named means, said spring elements having cam portions, and the second named means comprising a bar operatively engaging the cam portions of said elements in drawing the plate members into firm engagement with each other.

HO CHOW.

References Cited in the file of this patent

UNITED STATES PATENTS

| Number | Name | Date |
|---|---|---|
| 2,402,813 | Harada | June 25, 1946 |
| 2,477,607 | Hungate | Aug. 2, 1949 |
| 2,506,953 | Dzus | May 9, 1950 |